United States Patent
Nakamura

(10) Patent No.: US 12,158,537 B2
(45) Date of Patent: Dec. 3, 2024

(54) RADAR DEVICE

(71) Applicant: DENSO CORPORATION, Kariya (JP)

(72) Inventor: Takuya Nakamura, Kariya (JP)

(73) Assignee: DENSO CORPORATION, Kariya (JP)

(*) Notice: Subject to any disclaimer, the term of this patent is extended or adjusted under 35 U.S.C. 154(b) by 335 days.

(21) Appl. No.: 17/742,523

(22) Filed: May 12, 2022

(65) Prior Publication Data

US 2022/0268880 A1    Aug. 25, 2022

Related U.S. Application Data

(63) Continuation of application No. PCT/JP2020/024986, filed on Jun. 25, 2020.

(30) Foreign Application Priority Data

Feb. 12, 2020    (JP) .................................. 2020-021746

(51) Int. Cl.
*G01S 7/02* (2006.01)
*G01S 13/931* (2020.01)

(52) U.S. Cl.
CPC ............ *G01S 7/023* (2013.01); *G01S 13/931* (2013.01)

(58) Field of Classification Search
CPC .................. G01S 7/023; G01S 13/931
See application file for complete search history.

(56) References Cited

U.S. PATENT DOCUMENTS

| | | | |
|---|---|---|---|
| 6,469,662 B2* | 10/2002 | Tullsson | G01S 7/0232 342/159 |
| 2002/0086641 A1* | 7/2002 | Howard | H04L 12/2801 455/67.11 |
| 2004/0071363 A1* | 4/2004 | Kouri | G06T 5/10 382/128 |
| 2006/0125682 A1 | 6/2006 | Kelly et al. | |
| 2007/0120731 A1 | 5/2007 | Kelly et al. | |
| 2010/0073216 A1* | 3/2010 | Sakamoto | G01S 3/74 342/146 |
| 2012/0293359 A1 | 11/2012 | Fukuda et al. | |
| 2014/0039718 A1* | 2/2014 | Cheng | G01S 11/10 701/1 |
| 2017/0010344 A1* | 1/2017 | Corbett | G01S 7/023 |

FOREIGN PATENT DOCUMENTS

JP    2010-107219 A    5/2010

* cited by examiner

*Primary Examiner* — Peter M Bythrow
*Assistant Examiner* — Nazra Nur Waheed
(74) *Attorney, Agent, or Firm* — Posz Law Group, PLC

(57) ABSTRACT

A radar device includes: a transmission unit; a reception unit; an interference signal processing unit that cancels an influence of an interference signal from a beat signal; and an object detection unit that detects the object based on the beat signal. The interference signal processing unit includes: a digital converter that converts the beat signal into a time sample; a multiple resolution analysis unit that converts the time sample into time-frequency plots; an interference plot detection unit that detects an interference plot; an interference cancellation unit that cancels the influence of the interference signal; and a reverse converter that reverse converts the time-frequency plots into the time sample. The object detection unit detects the object using the reversely converted time sample.

19 Claims, 13 Drawing Sheets

RADAR DEVICE

CROSS REFERENCE TO RELATED APPLICATION

The present application is a continuation application of International Patent Application No. PCT/JP2020/024986 filed on Jun. 25, 2020, which designated the U.S. and claims the benefit of priority from Japanese Patent Application No. 2020-021746 filed on Feb. 12, 2020. The entire disclosures of all of the above applications are incorporated herein by reference.

TECHNICAL FIELD

The present disclosure relates to a radar device that transmits a transmission signal as an electromagnetic wave, receives a reflection signal reflected by the object, and detects the object based on the transmission/reception result.

BACKGROUND

As the radar device as described above, for example, the radar system and the radar device are known according to a conceivable technique.

In the radar system, for example, an interference signal such as a transmission signal transmitted from another radar device is detected based on a gradient value of a time sample obtained by converting a difference frequency signal, representing a frequency difference between a transmission signal and a reflection signal, into a digital signal. Then, the time sample in the interference period, in which the interference signal is detected, is set to be a value of zero, so that the interference signal is removed from the time sample. The system of Patent Literature 1 performs a FFT processing on the time sample from which the interference signal is removed, and detects an object based on the processing result.

Further, in the radar device, the sampled data of the signal indicating the frequency difference between the transmission signal and the reflection signal is divided by a plurality of interference determination periods having a predetermined length. Then, among all the interference determination periods, the interference determination period including the time point at which the interference is occurring is detected as the interference period. When the interference period is detected, the data sampled in the longest continuous interference determination period among the periods excluding the interference period in one cycle of the transmission signal is defined as a target of the FFT processing.

SUMMARY

According to an example, a radar device includes: a transmission unit; a reception unit; an interference signal processing unit that cancels an influence of an interference signal from a beat signal; and an object detection unit that detects the object based on the beat signal. The interference signal processing unit includes: a digital converter that converts the beat signal into a time sample; a multiple resolution analysis unit that converts the time sample into time-frequency plots; an interference plot detection unit that detects an interference plot; an interference cancellation unit that cancels the influence of the interference signal; and a reverse converter that reverse converts the time-frequency plots into the time sample. The object detection unit detects the object using the reversely converted time sample.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
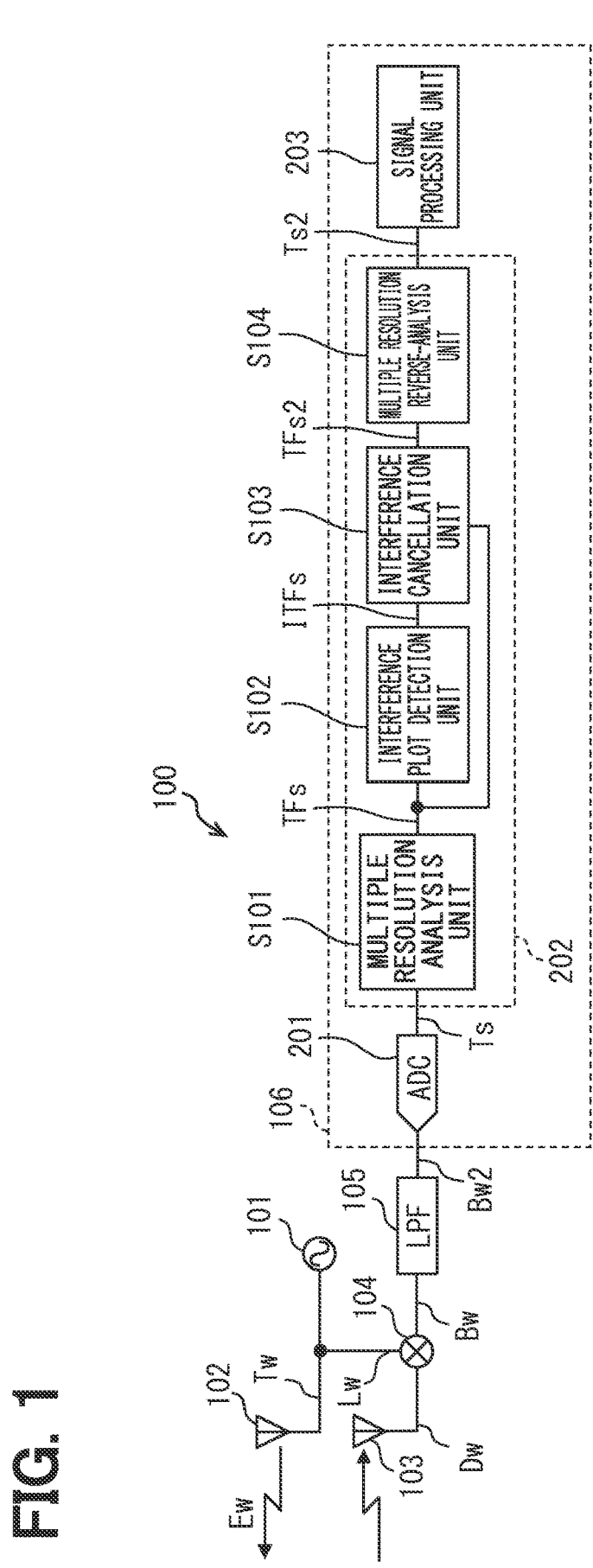
FIG. 1 is a block diagram showing an overall configuration of a radar device according to an embodiment.

When FFT processing is performed on the data in which the time sample of the interference period is zero-interpolated as in the radar system of a conceivable technique, ripples may occur in the processing results, so that there is a possibility such that the detection accuracy of the object is reduced. Further, when the interference period is excluded from the sampling data in order to prevent ripples from occurring in the FFT processing result as in the radar device of a conceivable technique, the number of data as the target of the FFT processing may decrease, so that there is a possibility that sufficient detection accuracy of the object may not be ensured.

The present embodiments has been made in view of the above-mentioned points, and provides a radar device capable of ensuring the detection accuracy of an object even when affected by interference due to an external disturbance electromagnetic wave.

In order to achieve the above object, the radar device according to the present embodiments includes:

a transmission unit that transmits a transmission signal as an electromagnetic wave;

a reception unit that receives the reflection signal that the transmission signal is reflected by the object;

an interference signal processing unit that cancels the influence of the interference signal from the beat signal when the beat signal, which is a mixture of the transmission signal and the reflection signal, is affected by the interference signal due to the external disturbance electromagnetic wave; and an object detection unit that detects an object based on a beat signal processed by an interference signal processing unit.

The interference signal processing unit includes:

a digital conversion unit that samples the beat signal and digitally converts it into a time sample;

a multiple resolution analysis unit that performs multi-resolution analysis on a time sample and converts the time sample into a time-frequency plot over multiple frequency scales;

an interference plot detection unit that detects an interference plot affected by an interference signal in a time-frequency plot on multiple frequency scales;

an interference cancellation unit that performs a cancellation processing to cancel the influence of the interference signal with respect to the interference plot detected by the interference plot detection unit; and a reverse conversion unit that performs reverse conversion of multiple resolution analysis on a time-frequency plot of multiple frequency scales that has been executed in the cancellation processing of the interference plot, and reversely converts the time-frequency plot into a time sample.

The object detection unit is configured to detect an object using a time sample that has been reversely converted by the reverse conversion unit as a beat signal processed by the interference signal processing unit.

As described above, in the radar device of the present embodiments, in the interference signal processing unit, the time sample obtained by digitally converting the beat signal is converted into a time-frequency plot over a plurality of frequency scales by multiple resolution analysis. In the time-frequency plot over the multiple frequency scales, the interference plot is detected, and the cancellation process for cancelling the influence of the interference signal on the interference plot is performed. Then, the time-frequency plots of a plurality of frequency scales that have been processed to cancel the influence of the interference signal on the interference plots are reversely converted into time samples. The object detection unit detects an object based on the time samples that have been reversely transformed.

According to the radar device of the present embodiments, the cancellation process for cancelling the influence of the interference signal is performed in the time-frequency plots of a plurality of frequency scales obtained by the multiple resolution analysis as a cancellation process of the interference signal, which is different from a conceivable technique for replacing the time sample itself or for compacting into only the sampling data in the interference determination period other than the interference period. Therefore, for example, even if the data of the interference plot is replaced with zero in the time-frequency plots of some frequency scales, the plot data of the time-frequency plots in other frequency scales remains, so that the time sample reversely converted from the time-frequency plots in the multiple frequency scales can approximate the value in case of no interference and the number of data in the time sample is not reduced. Therefore, the radar device of the present disclosure can detect an object with high accuracy based on a time sample that has been reversely converted.

First Embodiment

Hereinafter, the radar device according to the first embodiment will be described in detail with reference to the drawings. FIG. 1 is a block diagram showing the overall configuration of the radar device 100 according to the present embodiment. The radar device 100 described in this embodiment is mounted on a vehicle, for example, and can detect the distance, relative speed, and an direction of an object such as a vehicle traveling ahead. When the radar device 100 detects the distance, the relative speed, the direction, and the like of the object, the detection result is, for example, used in an adaptive cruise control device that controls the speed and the in-vehicle distance of the own vehicle so as to follow the vehicle in front, or in a pre-crash safety system that avoids a collision with the object and reduces a collision damage.

As shown in FIG. 1, the radar device 100 of the present embodiment includes a transmission signal generation unit 101 that transmits an electromagnetic wave signal Ew in the millimeter wave band via a transmission antenna 102. The transmission signal generation unit 101 includes, for example, a control unit, a D/A converter, and a voltage control oscillator. The control unit outputs a signal whose frequency gradually increases with time. The D/A converter converts the signal output from the control unit into digital-to-analog. The voltage control oscillator uses the analog signal output from the D/A converter as a modulation signal to generate a modulated millimeter-wave band high-frequency signal. The signal output from the voltage control oscillator is distributed at a predetermined ratio into the transmission signal Tw supplied to the transmission antenna 102 and the local signal Lw supplied to the signal mixture unit 104 described later.

The radar device 100 includes a reception antenna 103 that receives an electromagnetic wave signal Ew reflected by an object such as a preceding vehicle. When the reflected electromagnetic wave signal Ew is received by the reception antenna 103, the reception antenna 103 generates a reception signal Dw corresponding to the received electromagnetic wave signal Ew. Specifically, the reception antenna 103 changes at a frequency corresponding to the frequency of the received electromagnetic wave signal Ew, and generates a reception signal Dw having an amplitude corresponding to the intensity of the electromagnetic wave signal Ew. The reception signal Dw generated by the reception antenna 103 is output to the signal mixture unit 104.

The signal mixture unit 104 generates a beat signal Bw in which the reception signal Dw from the reception antenna 103 and the local signal Lw are mixed. The beat signal Bw generated by the signal mixture unit 104 is filtered by the low-pass filter 105, and passes only the beat signal Bw2 corresponding to the frequency difference between the reception signal Dw and the local signal Lw. The local signal Lw is a signal having a constant amplitude, whereas the reception signal Dw is a signal whose amplitude changes according to the intensity of the received electromagnetic wave signal Ew. Therefore, the amplitude of the generated beat signal Bw2 is also a signal whose amplitude changes according to the intensity of the received electromagnetic wave signal. The beat signal Bw2 generated in this way is input to the control arithmetic unit 106.

The control arithmetic unit 106 includes an analog-to-digital converter 201, an interference signal processing unit 202, and a signal processing unit 203. The analog-to-digital converter 201 samples the beat signal Bw2 at predetermined time intervals and converts it into digital data (i.e., a time sample) Ts. The time sample Ts of the beat signal Bw2 digitally converted by the analog-to-digital converter 201 is given to the interference signal processing unit 202.

The interference signal processing unit 202 and the signal processing unit 203 are configured by, for example, an in-vehicle computer mounted on a vehicle. The in-vehicle computer mainly includes at least one processor, a computer-readable non-transitory storage medium such as a RAM and a ROM, an input/output interface, and a bus connecting them. Alternatively, the in-vehicle computer may be configured to perform a part of or all of the signal processing by a dedicated hardware circuit as a processor. The interference signal processing unit 202 and the signal processing unit 203 may be configured by one in-vehicle computer or may be configured by separate in-vehicle computers.

Figure 2:
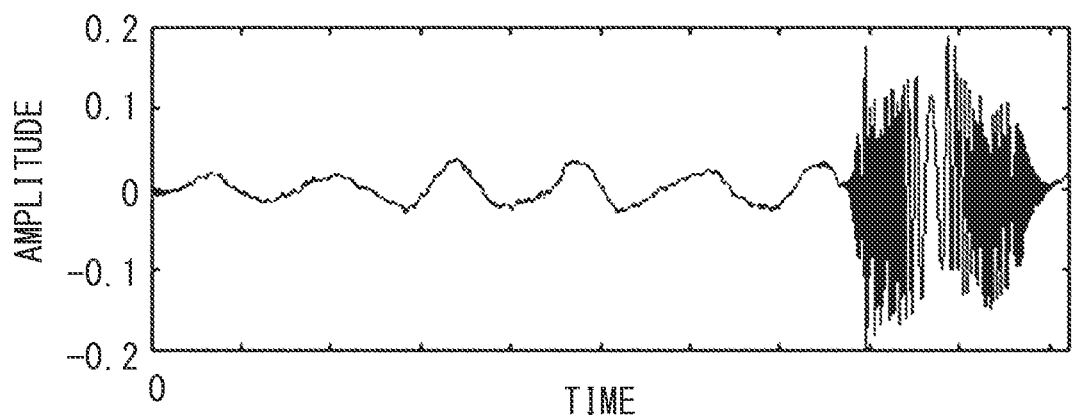
FIG. 2 is a graph showing an example of a time sample of a beat signal when the beat signal is affected by an interference signal due to an external disturbance electromagnetic wave.

When the time sample Ts of the beat signal Bw2 is affected by the interference signal due to the disturbance electromagnetic wave, the interference signal processing unit 202 may execute a process for cancelling the influence of the interference signal from the time sample Ts of the beat signal Bw2, or execute a process for cancelling the influence without determining whether the influence of the interference signal exists. In recent years, radar devices that use electromagnetic waves in a millimeter wave band as radar waves to detect distances to objects and the like are becoming widespread in vehicles. The radar devices include a FCM (Fast Chirp Modulation) radar device, a FMCW (Frequency-Modulated Continuous Wave) radar device, a dual frequency CW radar device, a multi-frequency CW radar device, a pulse radar device, and a spectrum diffusion radar device and the like. For such a millimeter wave radar, the radar wave from the radar device installed in another vehicle may become an external disturbance electromagnetic wave, and the beat signal Bw2 may be affected by the interference signal due to the disturbance electromagnetic wave. When the beat signal Bw2 is affected by the interference signal, for example, as shown in FIG. 2, the time sample Ts of the beat signal Bw2 includes a noise that may changes irregularly due to the interference signal.

Hereinafter, the configuration for performing the process for cancelling the influence of such an interference signal in the interference signal processing unit 202 will be described. As shown in FIG. 1, the interference signal processing unit 202 includes a multiple resolution analysis unit S101, an interference plot detection unit S102, an interference cancellation unit S103, and a multiple resolution reverse analysis unit S104. These configurations can be achieved by executing programs configured to provide their respective functions in the processor of an in-vehicle computer. Alternatively, these configurations may also be realized by a dedicated hardware circuit of the in-vehicle computer.

Here, as the waveform analysis, a Fourier analysis is generally used. Fourier analysis is an analysis method in which information on the time axis is Fourier transformed and replaced with information on the frequency axis for analysis. Here, in ordinary Fourier analysis, information on the time axis may be lost. On the other hand, if the wavelet transform is used, it may be possible to perform waveform analysis while maintaining the information on the time axis and the information on the frequency axis. In the present embodiment, the multiple resolution analysis unit S101 executes a multiple resolution analysis such that the multiple resolution analysis unit S101 repeatedly performs discrete wavelet transforms with different resolutions with respect to the time sample Ts of the beat signal Bw2, and converts the time sample Ts into a time-frequency plot over a plurality of frequency scales.

Figure 3:
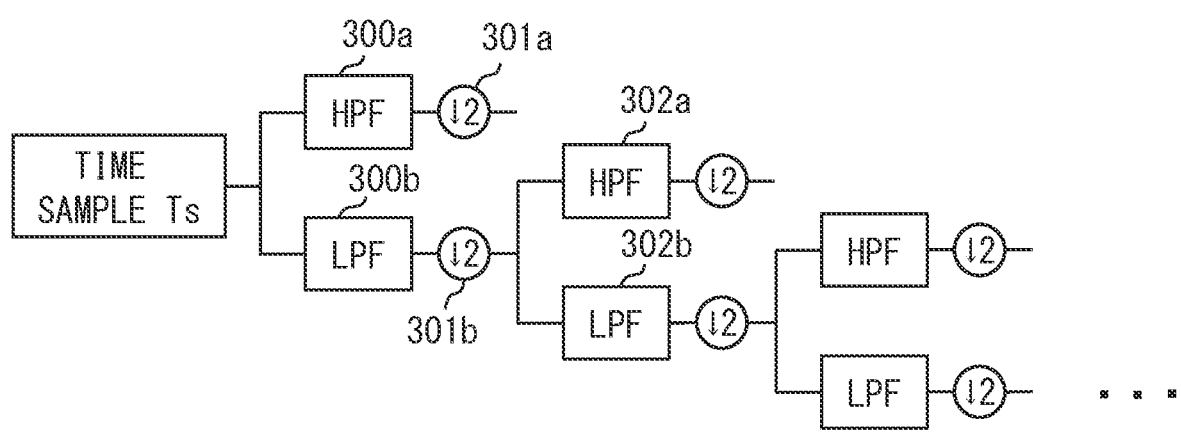
FIG. 3 is an explanatory diagram for explaining an example of a method of discrete wavelet conversion and multiple resolution analysis.

The discrete wavelet transform of the time sample Ts, which is an input signal, may be performed, for example, by passing through a set of a high-pass filter 300a and a low-pass filter 300b, as shown in FIG. 3. As a result, the time sample Ts is decomposed into a detail coefficient which is the output of the high-pass filter 300a and an approximation coefficient which is the output of the low-pass filter 300b. The high-pass filter 300a and the low-pass filter 300b form a quadrature mirror filter.

The output from the high-pass filter 300a and the output from the low-pass filter 300b are downsampled in half by the downsampling units 301a and 301b, respectively. Thus, the time resolution of the original signal is halved and the frequency resolution of the original signal doubles.

Figure 4:
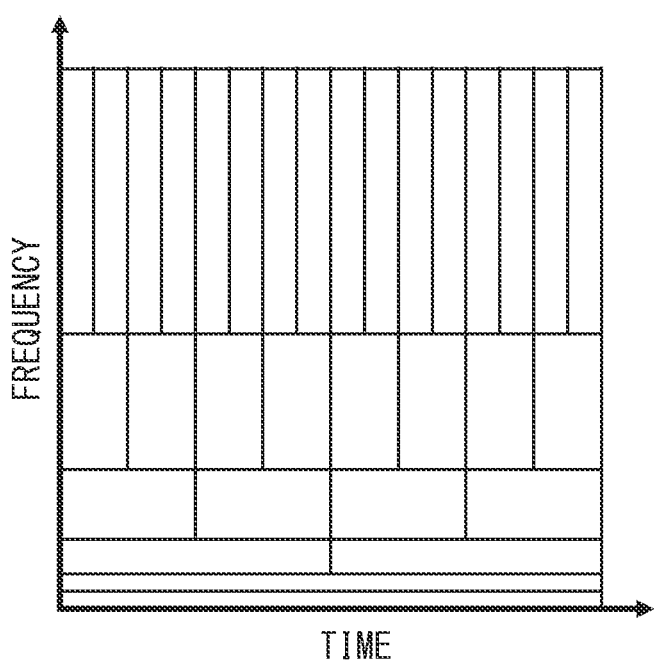
FIG. 4 is a diagram conceptually showing time-frequency plots of a plurality of frequency scales obtained by multi-resolution analysis.

In the multiple resolution analysis, the approximation coefficient output from the low-pass filter 300b is decomposed again by using a set of the high-pass filter 302a and the low-pass filter 302b. By repeating this, the time sample Ts is converted into time-frequency plots TFs of a plurality of frequency scales (i.e., frequency bands) as shown in FIG. 4. As an example, an input signal with a length of 2n can be decomposed into n levels at the maximum. Further, in FIG. 4, each cell indicates the number of data, and also indicates the frequency band and the time covered by the data. That is, in the multiple resolution analysis, the frequency resolution is high in the low frequency region, and the time resolution is high in the high frequency region.

On the other hand, in the multiple resolution analysis, the time sample which is the original input signal can be restored by reversely converting the result decomposed by the multiple resolution analysis. For example, in the example shown in FIG. 3, the calculation shown in FIG. 3 is performed in reverse (i.e., multiple resolution reverse analysis is performed) using the deepest level approximation coefficient and the detail coefficient of each level other than the deepest level, so that the result of the multiple resolution analysis can be reversely converted to the time sample Ts.

As shown in FIG. 1, the time-frequency plots TFs of a plurality of frequency scales, which are the conversion results of the multiple resolution analysis unit S101, are output to the interference plot detection unit S102 and the interference cancellation unit S103. The interference plot detection unit S102 first changes the amplitude of each plot to data with the absolute value of the amplitude based on the time-frequency plots TFs of a plurality of frequency scales. At this time, in order to further emphasize the characteristics of the signal intensity of each plot, the square value of the amplitude may be used instead of the absolute value of the amplitude, or the logarithmic value of the absolute value of the amplitude may be used.

Figure 5:
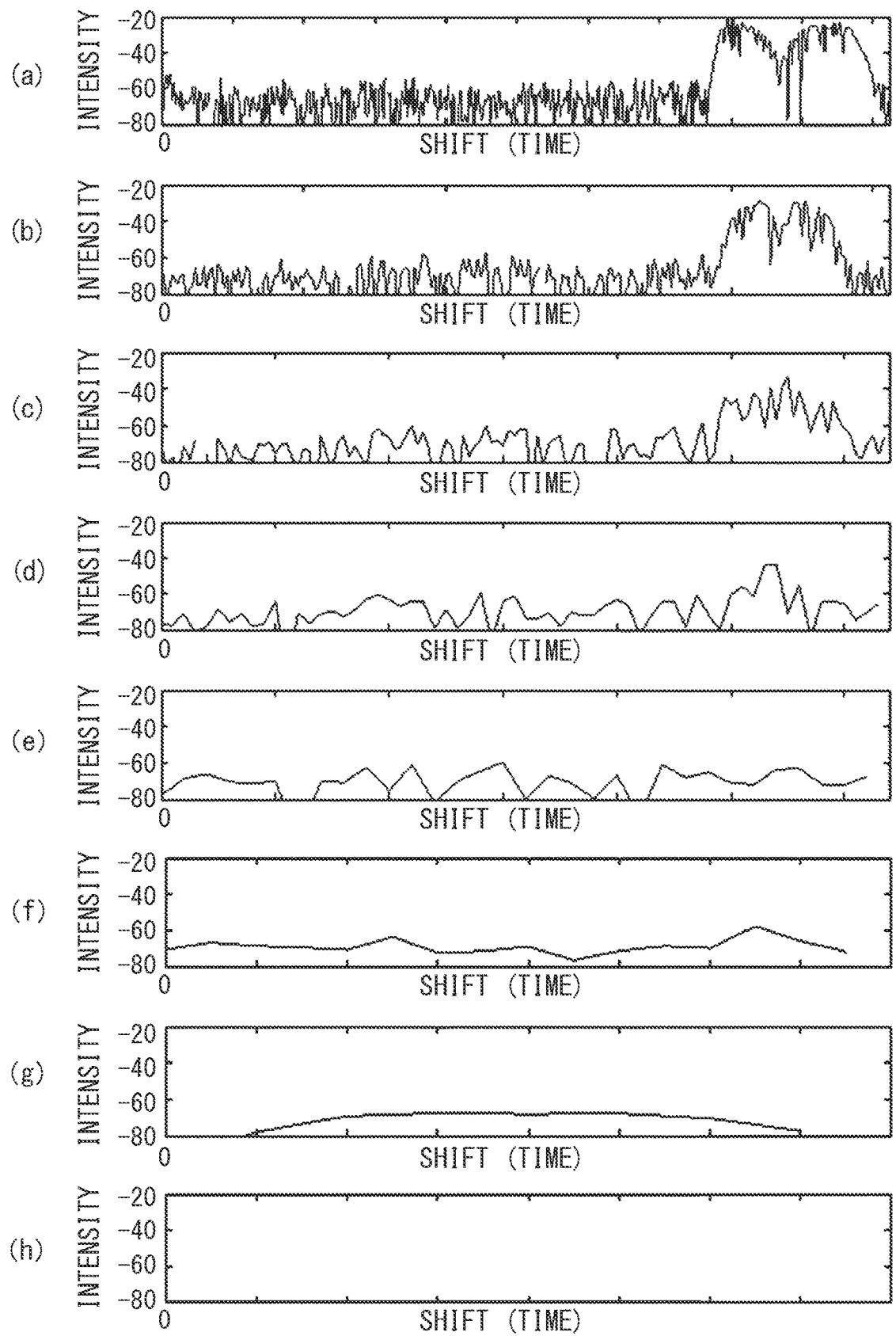
FIG. 5 is a graph of (a) to (h) showing the absolute value of the amplitude of each plot as the signal intensity of the time-frequency plot of each frequency scale.

(a) to (h) in FIG. 5 are graphs showing an example of data using the logarithm value of the absolute value of the amplitude of each plot as the signal intensity of each plot in the time-frequency plot of each frequency scale. For example, the graph of (a) in FIG. 5 shows the signal intensity of each plot included in the time-frequency plot of the frequency scale with the highest frequency band, where the number of plots is halved to 512 when the number of time samples Ts is 1024. The graph of (b) in FIG. 5 shows the signal intensity of each plot included in the time-frequency plot of the frequency scale with the second highest frequency band, where the number of plots is further halved to 256 in the graph of (a) in FIG. 5. Hereinafter, similarly, the graphs of (c) to (h) in FIG. 5 show the signal intensity of each plot included in the time-frequency plot of the frequency scale that becomes the lower frequency band by sequentially halving the number of plots. Although (a) to (h) in FIG. 5 show an example in which the time sample Ts is decomposed to 8 levels, when the number of time sample Ts is 1024, it can be decomposed to 10 levels.

Figure 6:
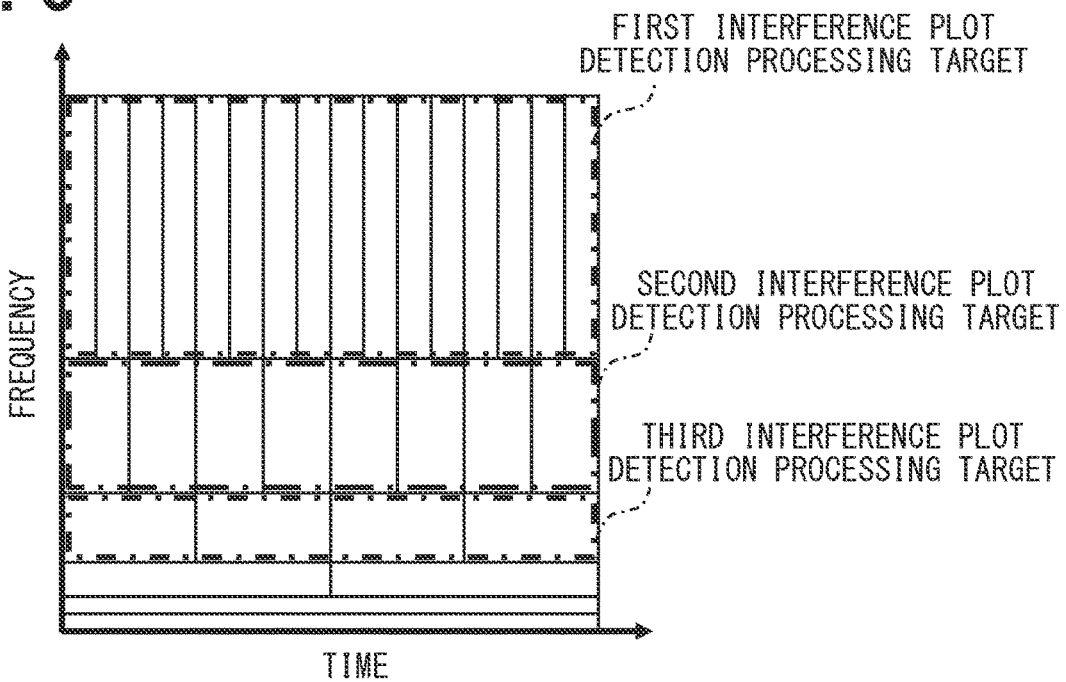
FIG. 6 is a diagram showing an example of a range as a detection target in one interference plot detection process by the interference plot detection unit.

The interference plot detection unit S102 detects the interference plot affected by the interference signal based on the signal intensity of each plot in the time-frequency plot of each frequency scale shown in (a) to (h) in FIG. 5. For example, the interference plot detection unit S102 can detect a plot whose signal intensity is equal to or higher than a predetermined threshold value as an interference plot. In this case, the interference plot detection unit S102 may detect the interference plot for each time-frequency plot of each frequency scale using individual threshold values according to the characteristics of each frequency scale, as shown by the alternate long and short dash line in FIG. 6. That is, the interference plot is detected with the time-frequency plot of the highest frequency band as the first interference plot detection processing target, and the interference plot is detected with the time-frequency plot of the second highest frequency band as the second interference plot detection processing target. Then, the interference plot is detected with the time-frequency plot of the third highest frequency band as the third interference plot detection processing target. The time-frequency plots in lower frequency bands than the above bands are also subject to interference plot detection processing targets, separately.

Figure 7:
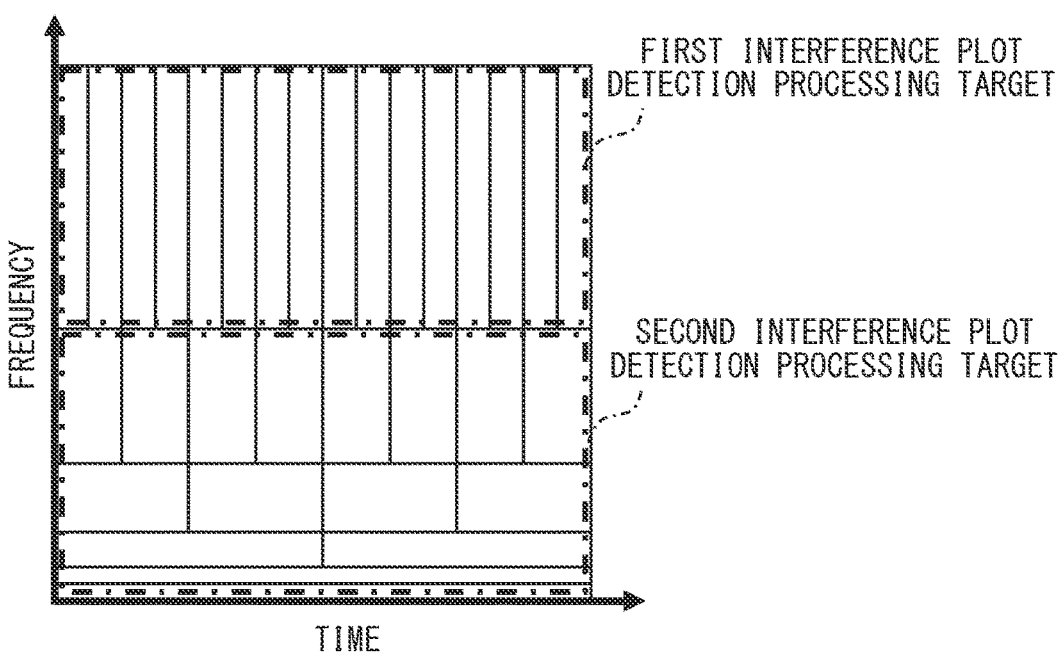
FIG. 7 is a diagram showing another example of a range as a detection target in one interference plot detection process by the interference plot detection unit.
Figure 8:
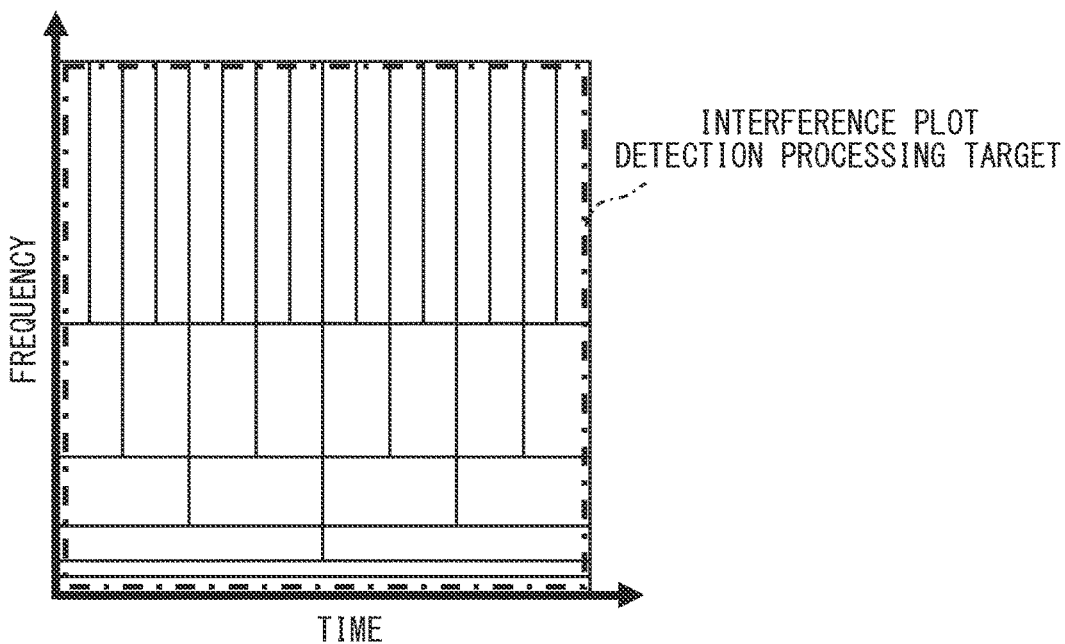
FIG. 8 is a diagram showing a further another example of a range as a detection target in one interference plot detection process by the interference plot detection unit.

Alternatively, as shown by the alternate long and short dash line in FIGS. 7 and 8, the interference plot detection unit S102 may execute the process for detecting the interference plot by collectively using the time-frequency plots of at least two or more frequency scales in the time-frequency plots of a plurality of frequency scales. In the time-frequency plots of two or more frequency scales in which the interference plot detection process is performed collectively, the signal intensity of each plot is determined using the same threshold. FIG. 7 shows an example such that the time-frequency plot of the frequency scale having the highest frequency band is independently the target of the interference plot detection processing as the first interference plot detection processing target, and the other time-frequency plots of a plurality of other frequency scales is collectively targets of the interference plot detection processing as the second interference plot detection processing target. Further, FIG. 8 shows an example in which the time-frequency plots of all frequency scales are collectively defined as the target of the interference plot detection processing by one interference plot detection process.

Additional or alternatively, the interference plot detection unit S102 may perform statistical out-of-range test of the signal intensity of each plot, and detect the plot of the signal intensity corresponding to the out-of-range value as an interference plot. As a statistical out-of-range test, for example, the mean or median of the signal intensities of all the plots as the target of the detection process of the interference plot is calculated, a predetermined value is added to the mean or median of the signal intensities to define a reference value, the signal intensity is determined as the out-of-range value when the signal intensity exceeds the reference value, and the signal intensity is determined as the in-range value when the signal intensity does not exceed the reference value. Alternatively, the interference plot detection unit S102 may divide the magnitude of the signal intensity into a plurality of ranges, determine which divided range the signal intensity of each plot belongs to, and execute the out-of-range test based on the number or the ratio of the plots belonging to each division. Even when the interference plot is detected by such an out-of-range test, the interference plot may be detected for each time-frequency plot of each frequency scale, similar to a case where the plot having the signal intensity is equal to or higher than a predetermined threshold is defined as an interference plot. Alternatively, a process for detecting the interference plot by collectively processing time-frequency plots of at least two or more frequency scales.

Further, additionally or alternatively, the interference plot detection unit S102 may obtain the signal intensity gradient of each plot using the signal intensities of adjacent plots on the time axis, and detect a plot having the signal intensity gradient larger than a predetermined threshold value as the interference plot. In this case as well, the interference plot may be detected for each time-frequency plot of each frequency scale, similar to a case where the plot having the signal intensity equal to or higher than a predetermined threshold is detected as an interference plot. Alternatively, a process for detecting the interference plot by collectively processing time-frequency plots of at least two or more frequency scales.

Further, additionally or alternatively, the interference plot detection unit S102 may obtain the signal intensity gradient of each plot using the signal intensities of adjacent plots on the time axis, and perform a statistical out-of-range test of the signal intensity gradient of each plot, and detect the plot having the signal intensity gradient corresponding to the out-of-range value as an interference plot. The statistical out-of-range test of the gradient of the signal intensity may also be performed in the same manner as the statistical out-of-range test of the signal intensity described above.

Further, in this case as well, the interference plot may be detected for each time-frequency plot of each frequency scale in the same manner as in the case where the plot having a signal intensity equal to or higher than a predetermined threshold is detected as an interference plot. Alternatively, a process for detecting the interference plot by collectively processing time-frequency plots of at least two or more frequency scales.

When the interference plot detection unit S102 performs a statistical out-of-range test of the gradient of the signal intensity, additionally, it may be preferable that the interference plot detection unit S102 acquire the sum of the signal intensities of each plot using the signal intensities of adjacent plots on the time axis, perform a statistical out-of-range test of the sum of the signal intensities, and detect the plot having the sum of the signal intensities corresponding to the out-of-range value as an interference plot. Since the gradient of the signal intensity of each adjacent plot on the time axis corresponds to the difference in the signal intensity of each plot, obtaining the gradient of the signal intensity provides a function of a high-pass filter. Therefore, by performing a statistical out-of-range test of the gradient of the signal intensity, it is possible to detect the interference in the high frequency region with high accuracy. On the other hand, calculation of the sum of the signal intensities of adjacent plots on the time axis provides a function of a low-pass filter. Therefore, by performing a statistical out-of-range test of the sum of the signal intensity, it is possible to detect the interference in the low frequency region with high accuracy. Therefore, by using both the statistical out-of-range test of the gradient of the signal intensity and the statistical out-of-range test of the sum of the signal intensity, it is possible to detect the interference in both the high frequency region and the low frequency region with high accuracy.

The interference plot detection unit S102 may detect the interference plot and store the detection result in a memory (not shown). Alternatively, the interference plot detection unit S102 may sequentially perform the cancellation of the influence of the interference signal with respect to the time-frequency plots TFs of a plurality of frequency scales using the interference cancellation unit S103, by sequentially inputting the detection result to the interference cancellation unit S103 each time the interference plot is detected.

Figure 9:
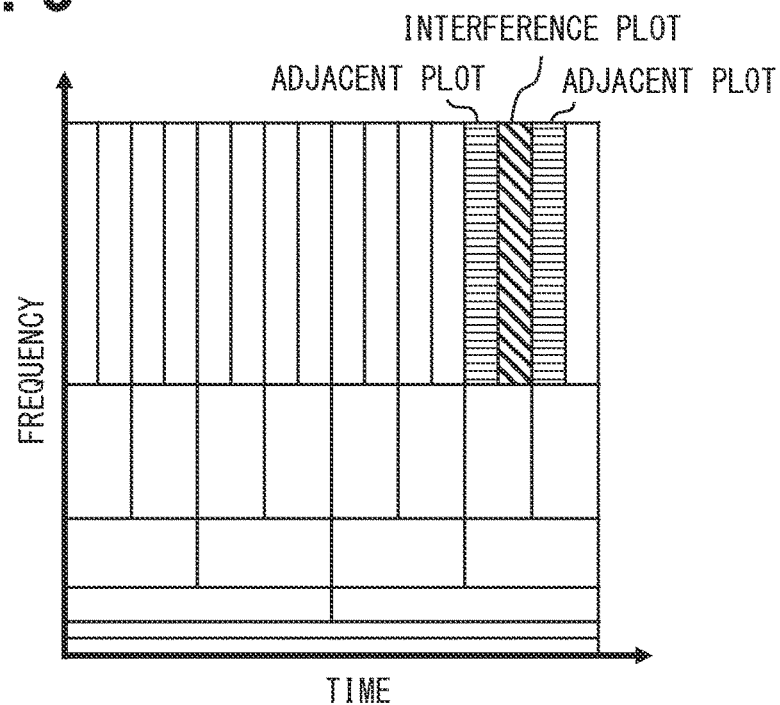
FIG. 9 is an explanatory diagram for explaining that the interference plot detection unit detects an adjacent plot adjacent to the interference plot on the time axis as an equivalent interference plot equivalent to the interference plot in a time-frequency plot of the same frequency scale.
Figure 10:
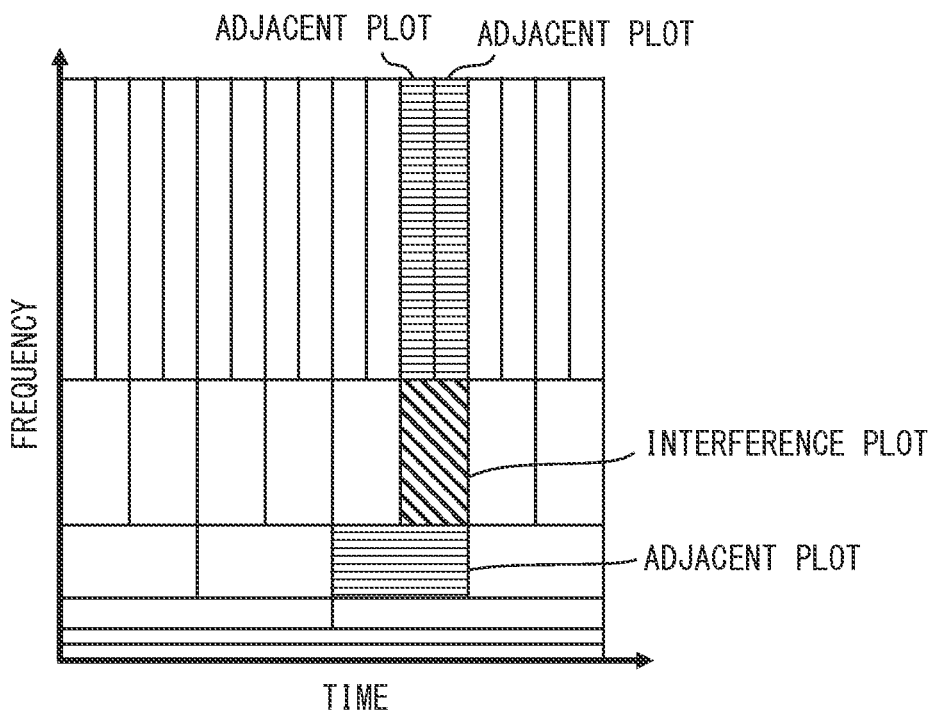
FIG. 10 is an explanatory diagram for explaining that the interference plot detection unit detects an adjacent plot adjacent to the interference plot on the frequency axis as an equivalent interference plot equivalent to the interference plot in a time-frequency plot of the different frequency scale.
Figure 11:
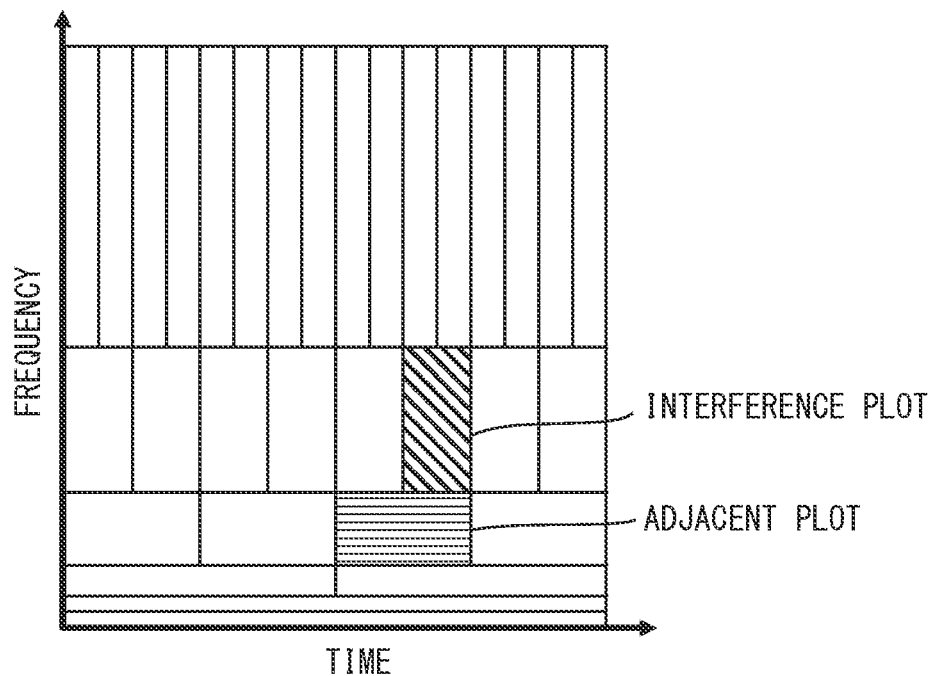
FIG. 11 is an explanatory diagram for explaining that the interference plot detection unit detects only an adjacent plot adjacent to the interference plot on the low frequency side on the frequency axis as an equivalent interference plot equivalent to the interference plot.

Here, the interference plot detection unit S102 may detect an adjacent plot adjacent to the detected interference plot as an equivalent interference plot equivalent to the interference plot although the equivalent interference plot is not detected as the interference plot by the above-mentioned various methods, in addition to the plot detected as the interference plot by the above-mentioned various methods. For example, as shown in FIG. 9, the interference plot detection unit S102 may detect adjacent plots adjacent to the interference plot on the time axis as an equivalent interference plot equivalent to the interference plot in a time-frequency plot of the same frequency scale. Alternatively, as shown in FIG. 10, the interference plot detection unit S102 may detect adjacent plots adjacent to the interference plot on the frequency axis as an equivalent interference plot equivalent to the interference plot in a time-frequency plot of the different frequency scale. As for the adjacent plots adjacent to the interference plot on the frequency axis, as shown in FIG. 11, the interference plot detection unit S102 may detect only the adjacent plot on the low frequency side as an equivalent interference plot equivalent to the interference plot.

The interference plot detection unit S102 outputs the detection results ITFs to the interference cancellation unit S103 after completing the detection whether or not the interference plot exists and the optional detection of the equivalent interference plot equivalent to the interference plot for all plots included in the time-frequency plots of a plurality of frequency scales. Alternatively, as described above, the interference plot detection unit S102 may output the detection result ITFs to the interference cancellation unit S103 each time an interference plot is detected and, optionally, an equivalent interference plot equivalent to the interference plot is detected.

The interference cancellation unit S103 specifies the interference plot in the time-frequency plots TFs of a plurality of frequency scales, based on the time-frequency plots TFs of a plurality of frequency scales received from the multiple resolution analysis unit S101 and the detection result ITFs of the interference plot by the interference plot detection unit S102. Each plot in the data, in which the amplitude of each plot is changed to the absolute value of the amplitude, used by the interference plot detection unit S102 to detect the interference plot corresponds to the respective plot in the time-frequency plots TFs of a plurality of frequency scales received from the multiple resolution analysis unit S101, in an one-to-one correspondence manner. Therefore, the interference cancellation unit S103 determines which plot is the interference plot among the plots included in the time-frequency plots TFs of a plurality of frequency scales, according to the detection result ITFs of the interference plot by the interference plot detection unit S102.

The interference cancellation unit S103 performs a cancellation process for cancelling the influence of the interference signal with respect to the specified interference plot. As this cancellation process, the plot specified as the interference plot may be substituted with data corresponding to zero among the time-frequency plots TFs of a plurality of frequency scales in the interference cancellation unit S103.

Figure 12:
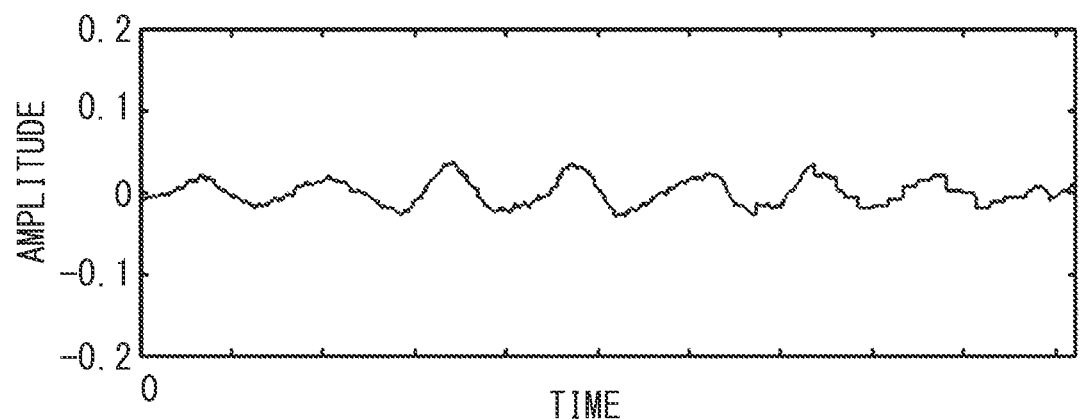
FIG. 12 is a graph showing an example of a time sample that has been reversely converted from time-frequency plot of a plurality of frequency scales after performing the cancellation process by the interference cancellation unit.

As will be described later, the interference signal processing unit 202 performs multiple resolution reverse analysis on the time-frequency plots TFs2 of a plurality of frequency scales after performing the cancellation process for cancelling the influence of the interference signal, so that the interference signal processing unit 202 reversely converts the time-frequency plots TFs2 of the multiple frequency scales to the time sample Ts2. Thus, for example, even when the data of the interference plot is replaced with zero in the time-frequency plots TFs of a part of the frequency scales, the plot data of the time-frequency plots TFs of other frequency scales remains. Therefore, for example, as shown an example in FIG. 12, it is possible to approximate the value of the case where the interference does not occur, using the time sample Ts2 that is reversely converted from the time-frequency plot TFs2 of the plurality of frequency scales output from the interference cancellation unit S103 after the cancellation process.

Here, when the data corresponding to zero is substituted into the plot specified as the interference plot, the amount of information when reversely converting to the time sample Ts2 is reduced, so that the waveform of the reversely converted time sample Ts2 may be slightly different from the original waveform (i.e., the waveform in a case where there is no interference). In order to make the waveform of the reversely converted time sample Ts2 closer to the original waveform, the interference cancellation unit S103 may use, for example, an autoregressive model (AR model) to estimate a value in the interference plot based on a waveform obtained by a plot other than the interference plot, and substitute an estimated value for the interference plot. Alternatively, the interference cancellation unit S103 may change the data of the plot specified as the interference plot to the data obtained by multiplying the original data by an attenuation coefficient that attenuates the size of the interference plot. The attenuation coefficient may be a constant value or a variable value. In the case of a variable value, for example, the attenuation coefficient may be determined so that the magnitude of the amplitude of the interference plot is at the same level as the magnitude of the amplitude of the uninterfered plot.

The time-frequency plots TFs2 of the plurality of frequency scales after performing the cancelation process for cancelling the influence of the interference signal by the interference cancellation unit S103 is output to the multiple resolution reverse analysis unit S104. The multiple resolution reverse analysis unit S104 performs reverse conversion of the multiple resolution analysis on the received time-frequency plots TFs2 of the plurality of frequency scales, and reversely converts the plurality of time-frequency plots TFs2 into the time sample Ts2. That is, the multiple resolution reverse analysis unit S104 corresponds to the reverse conversion unit. The time sample Ts2 reversely converted by the multiple resolution reverse analysis unit S104 is output to the signal processing unit 203.

When the FCM type radar device is adopted, the signal processing unit 203 obtains the distance to the object by performing the distance detection FFT process on the received time sample Ts2. Further, the signal processing unit 203 obtains the speed of the object by further performing the speed detection FFT processing on the result obtained by the distance detection FFT processing.

Figure 13:
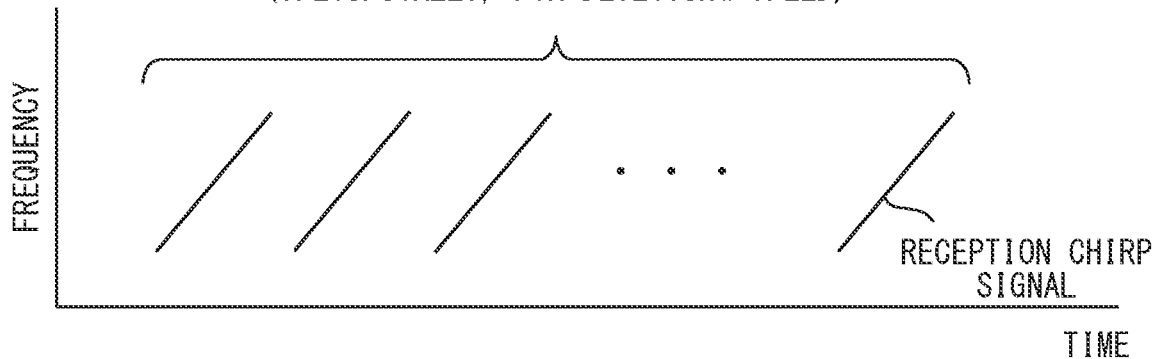
FIG. 13 is a graph showing a plurality of reception chirp signals required for object detection (particularly, velocity detection of an object).

For example, when an FCM type radar device is adopted as the radar device 100, the radar device 100 repeatedly transmits, for example, a transmission chirp signal whose frequency gradually increases as an electromagnetic wave signal Ew at predetermined intervals. When the transmission chirp signal is reflected by the object, the reception antenna 103 receives a reception chirp signal whose frequency gradually increases similar to the transmission chirp signal after a time delay according to the distance to the object, as shown in FIG. 13. When the distance to the object is constant, the frequency difference between the transmission chirp signal and the reception chirp signal becomes a constant frequency according to the distance. Therefore, in the distance detection FFT process, the signal processing unit 203 performs Fourier analysis on the time sample Ts2 and extracts the frequency corresponding to the frequency difference between the transmission chirp signal and the reception chirp signal to obtain the distance to the target object. Further, the signal processing unit 203 further performs the speed detection FFT process on the waveform executed in the distance detection FFT processing with respect to the time sample Ts2 showing the frequency difference of the plurality of reception chirp signals. When there is a speed difference between the own vehicle and the object, the phase of the peak waveform of the distance detection FFT process of the time sample Ts2 indicating the frequency difference of the plurality of reception chirp signals changes due to the Doppler effect. Therefore, the signal processing unit 203 further performs the speed detection FFT process on the distance detection FFT processed waveform of the time sample Ts2 indicating the frequency difference of the plurality of reception chirp signals to obtain the speed (i.e., the relative velocity) of the object.

Figure 14:
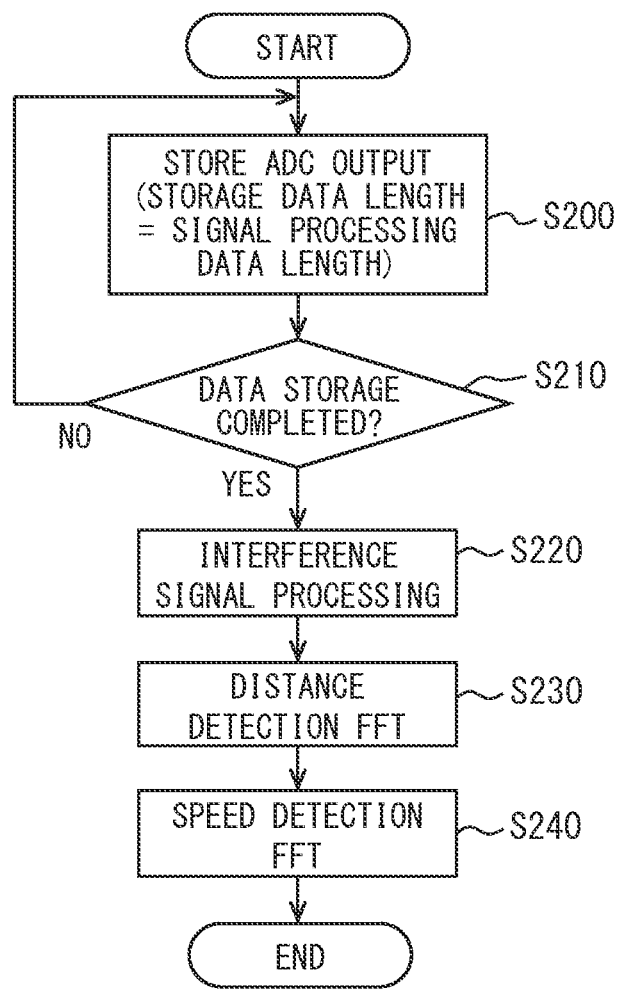
FIG. 14 is a flowchart showing an example of a signal processing flow by an interference signal processing unit and a signal processing unit.

FIG. 14 is a flowchart showing an example of a signal processing flow by an interference signal processing unit 202 and a signal processing unit 203. According to the process of the flowchart shown in FIG. 14, in step S200, the data of the time sample Ts digitally converted by the analog-to-digital converter 201 is stored in the memory. As shown in FIG. 13, the data length that can be stored in this memory is the number of data (i.e., the data length) of the time sample Ts obtained by digitally converting a plurality of reception chirp signals required for object detection (particularly, object speed detection).

In step S210, it is determined whether or not the data of the time sample Ts is stored in the entire storage area of the memory. When an affirmative determination is made in this determination process, it means that the data necessary for detecting the measurement object has been collected, and the process proceeds to step S220. On the other hand, when a negative determination is made in step S210, the process of step S200 is repeated until the time sample Ts having a required data length is collected.

In step S220, the interference signal processing including: the multiple resolution analysis by the multiple resolution analysis unit S101 described above; the detection of the interference plot by the interference plot detection unit S102; the interference cancellation by the interference cancellation unit S103; and the reverse conversion to the time sample Ts2 by the multiple resolution reverse analysis unit S104 is performed for each time sample Ts of each reception chirp signal. In step S230, the distance detection FFT is performed on the time sample Ts2 corresponding to the frequency difference of each reception chirp signal processed by the interference signal processing in step S220, and the distance to the object is obtained. In step S240, the speed detection FFT is performed on the plurality of distance detection FFT processing waveforms in step S230 to obtain the speed of the object.

Figure 15:
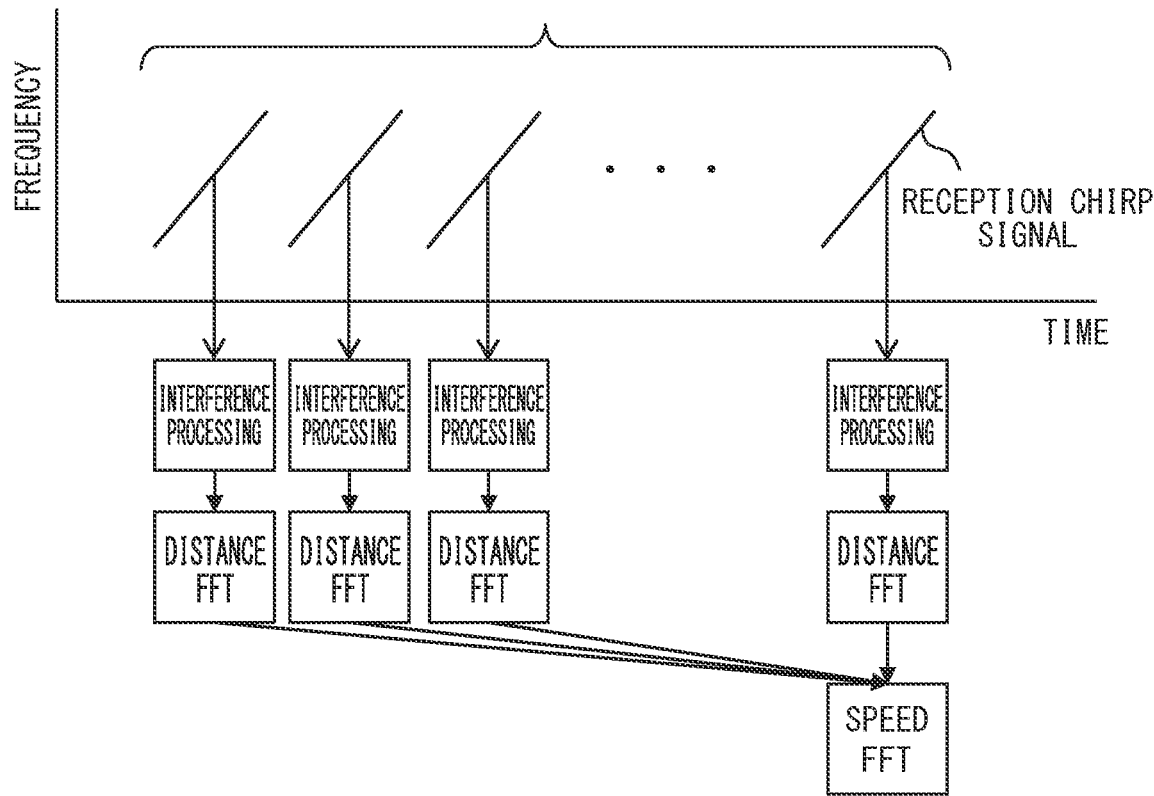
FIG. 15 is a graph visually showing an example of another signal processing different from the signal processing of FIG. 14.
Figure 16:
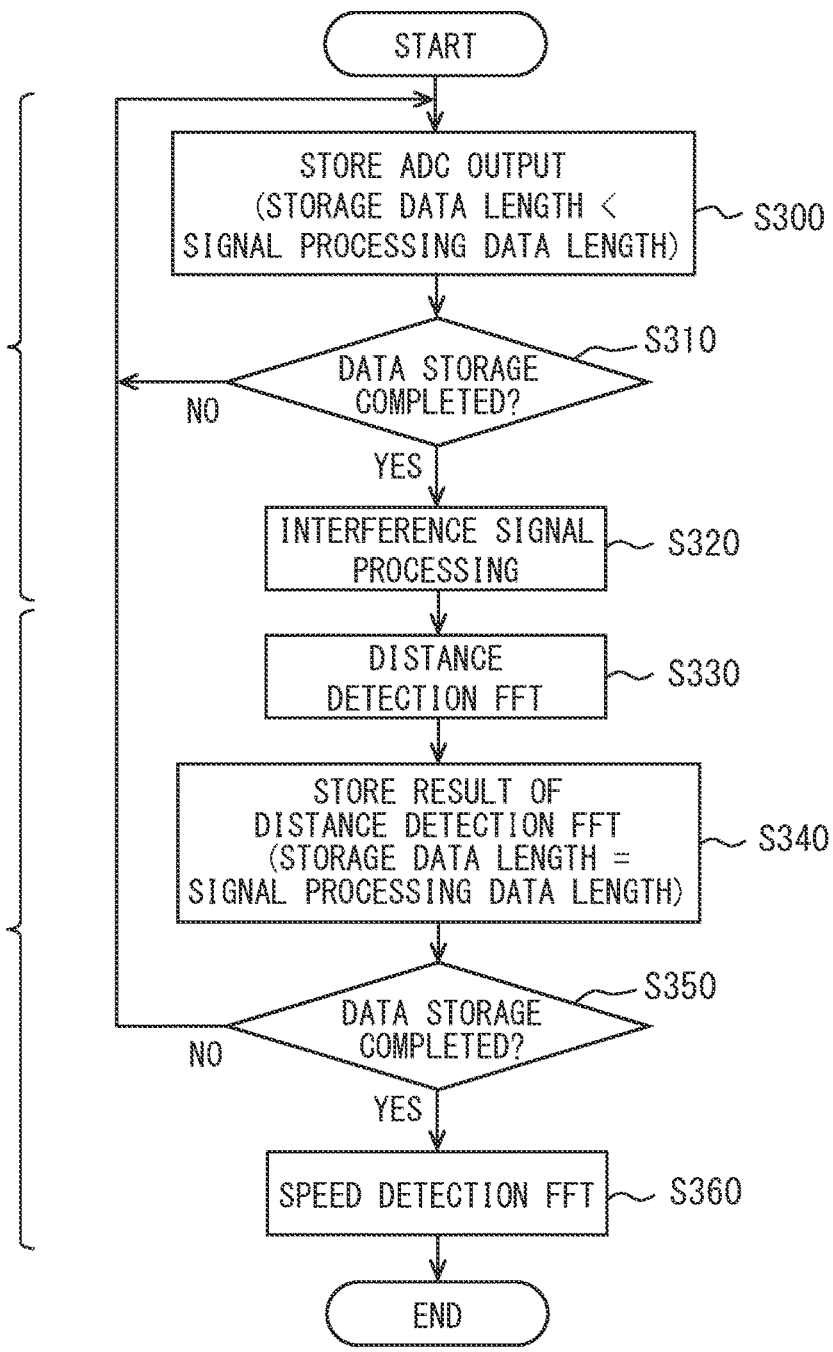
FIG. 16 is a flowchart showing a process by an interference signal processing unit and a signal processing unit for executing the signal processing of FIG. 15.

The flowchart of FIG. 14 shows an example in which the interference signal processing, the distance detection FFT, and the speed detection FFT are performed after all the data necessary for object detection is collected. Alternatively, in order to detect the object more quickly, the interference signal processing unit 202 and the signal processing unit 203 may execute the interference signal processing, the distance detection FFT, and the speed detection FFT as shown in FIGS. 15 and 16. That is, as visually shown in FIG. 15, the interference signal processing unit 202 and the signal processing unit 203 execute the interference signal processing and the distance detection FFT every time the time samples Ts indicating the frequency difference of the individual reception chirp signal is collected. Further, the signal processing unit 203 executes the speed detection FFT when the time sample Ts having the data length required for speed detection of the object is obtained. This makes it possible to determine the distance and the speed of the object more quickly.

FIG. 16 is a flowchart showing the processing contents of the interference signal processing unit 202 and the signal processing unit 203 when performing the interference signal processing, the distance detection FFT, and the speed detection FFT in the time schedule shown in FIG. 15. In step S300, the data of the time sample Ts digitally converted by the analog-to-digital converter 201 is stored in the memory. In this case, the data length stored in the memory is shorter than the number of data (i.e., the data length) of the time sample Ts obtained by digitally converting a plurality of reception chirp signals required for object detection (particularly, object speed detection). More specifically, the storage area of the time sample Ts of the memory can store the data length of the time sample Ts indicating the frequency difference of one reception chirp signal.

In step S310, it is determined whether or not the storage of the data of the time sample Ts indicating the frequency difference of one reception chirp signal is completed in the storage area of the time sample Ts of the memory. When an affirmative determination is made in this determination process, the process proceeds to step S320. On the other hand, when a negative determination is made in step S310, the process of step S300 is repeated until the time sample Ts having a required data length is collected.

In step S220, the interference signal processing including: the multiple resolution analysis by the multiple resolution analysis unit S101 described above; the detection of the interference plot by the interference plot detection unit S102; the interference cancellation by the interference cancellation unit S103; and the reverse conversion to the time sample Ts2 by the multiple resolution reverse analysis unit S104 is performed for each time sample Ts of one reception chirp signal. In step S330, the distance detection FFT is performed on the time sample Ts2 corresponding to the frequency difference of one reception chirp signal processed by the interference signal processing in step S320, and the distance to the object is obtained. In step S340, the distance detection FFT processing result performed in step S330 is stored in the memory. The storage area of the distance detection FFT processing result of the memory can store data having the data length required for performing signal processing (i.e., the speed detection FFT) for detecting the speed of the object.

In step S350, it is determined whether or not data having a data length required for performing the speed detection FFT is stored in the storage area of the distance detection FFT processing result of the memory. When an affirmative determination is made in this determination process, it means that the data necessary for performing the speed detection FFT has been collected, and the process proceeds to step S360. On the other hand, when a negative determination is made in step S350, the process of steps S300 to S340 is repeated until the data having the necessary data length is collected. In step S360, the speed detection FFT is performed on the distance detection FFT processing waveform based on the distance detection FFT processing result, and the speed of the object is obtained.

FIGS. 15 and 16 show an example such that the interference signal processing unit 202 and the signal processing unit 203 execute the interference signal processing and the distance detection FFT each time the time sample Ts indicating the frequency difference of the individual reception chirp signal is collected. Here, only the interference signal processing unit 202 may execute the interference signal processing every time the time sample Ts indicating the frequency difference of each reception chirp signal is collected, and the signal processing unit 203 may execute the distance detection FFT and the speed detection FFT when all the data having data length necessary for executing the speed detection FFT.

Further, in the radar device 100 described above, at least one of the transmission antenna 102 and the reception antenna 103 may include a plurality of antennas, so that the arrival direction of the reflection wave by the object is estimated. As a result, the radar device 100 can also detect the direction of the object.

As described above, in the radar device 100 of the present embodiment, the interference cancellation unit S103 executes the cancellation process for cancelling the influence of the interference signal in the time-frequency plot of a plurality of frequency scales analyzed by multiple resolution analysis, which is different from a conceivable technique as the cancellation process of the interference signal for replacing the value of the time sample itself, or for shortening the sampling data in the interference determination period other than the interference period. Therefore, the radar device 100 of the present disclosure can detect an object with high accuracy based on a time sample Ts2 that has been reversely converted.

Second Embodiment

Next, a second embodiment of the present disclosure will be described. In the radar device of the first embodiment described above, the multiple resolution analysis unit S101 repeats the discrete wavelet transform using a set of filters of the high-pass filter 300a and the low-pass filter 300b to convert the time sample Ts into time-frequency plots of a plurality of frequency scales.

Here, the method for performing the multiple resolution analysis of the time sample Ts may not be limited to the method described in the first embodiment. For example, the multiple resolution analysis unit S101 may perform a discrete wavelet transform using a so-called lifting scheme. In the lifting scheme, the signal is divided into an even-numbered element and an odd-numbered element, the odd-numbered element is estimated from the even-numbered element, the deviation from the estimation is defined as the high-frequency component, and the residual is defined as the low-frequency component. By adopting such a method, the multiple resolution analysis unit S101 can perform the discrete wavelet transform with high speed and eventually perform the multiple resolution analysis. Since the discrete wavelet transform by the lifting scheme can handle the Haar wavelet and the biorthogonal wavelet, it is possible to adopt both the Haar wavelet and the biorthogonal wavelet as the mother wavelet.

Third Embodiment

Figure 17:
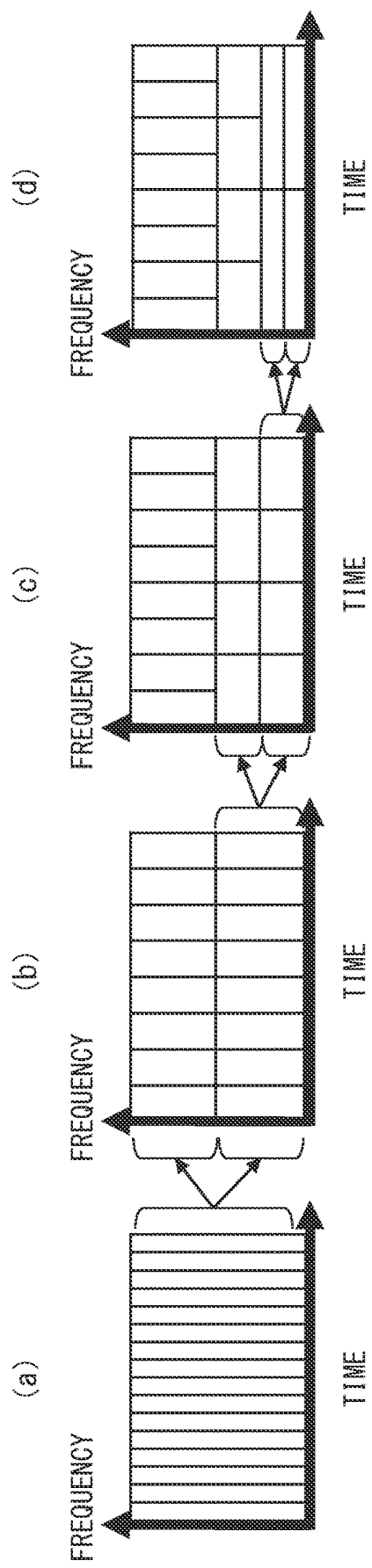
FIG. 17 is a diagram of (a) to (d) conceptually showing a feature that a decomposition of a low-frequency component is repeatedly performed by the multiple resolution analysis according to the first embodiment.

Next, a third embodiment of the present disclosure will be described. In the radar device of the first embodiment described above, the multiple resolution analysis unit S101 first uses a set of the high-pass filter 300a and the low-pass filter 300b to decompose the time sample Ts shown in (a) in FIG. 17 into the high frequency component (i.e., the detailed coefficient) which is the output of the high-pass filter 300a and the low frequency component (i.e., the approximate coefficient) which is the output of the low-pass filter 300b, as shown in (b) of FIG. 17. Then, the multiple resolution analysis unit S101 uses a set of the high-pass filter 302a and the low-pass filter 302b again to decompose the low-frequency component output from the low-pass filter 300b into the high-frequency component and the low-frequency component as shown in (c) in FIG. 17. By repeating such decomposition, the multiple resolution analysis unit S101 converts the time sample Ts to a time-frequency plot of multiple frequency scales (i.e., frequency bands), in which the frequency resolution in the low frequency region is increased, and the time resolution in the high frequency region is increased.

Figure 18:
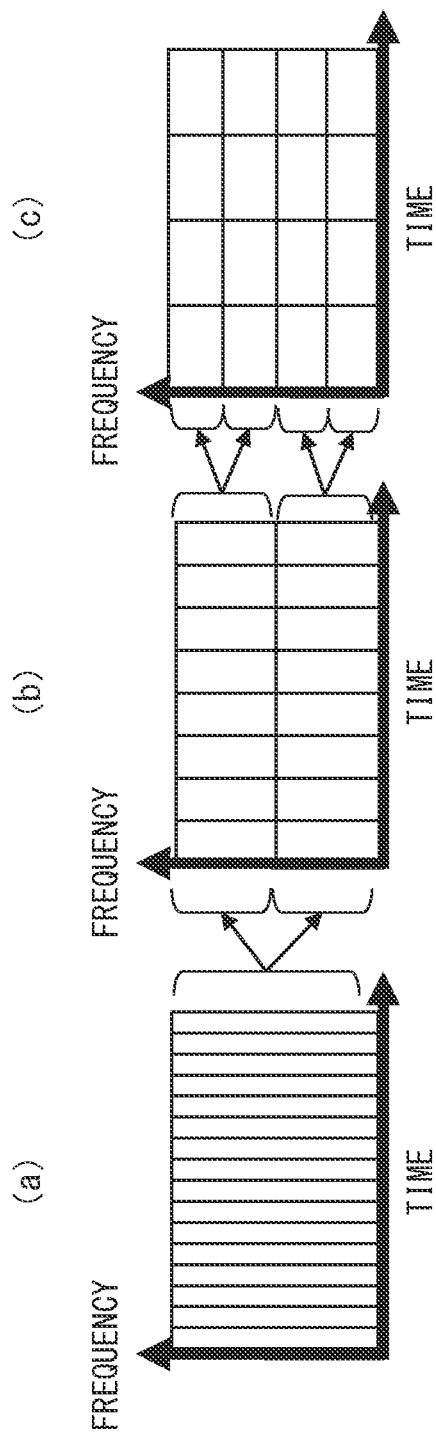
FIG. 18 is a diagram of (a) to (c) conceptually showing a feature that a decomposition of a high-frequency component in addition to the low-frequency component is repeatedly performed by the multiple resolution analysis according to the third embodiment.

On the other hand, in the present embodiment, the multiple resolution analysis unit S101 decomposes the high frequency component as the output from the high pass filter in addition to the low frequency component as the output from the low pass filter into a high frequency component and a low frequency component by using a set of a high-pass filter and a low-pass filter again. For example, in (a), (b) and (c) in FIG. 18, the time sample Ts is decomposed into a high-frequency component and a low-frequency component using a set of a high-pass filter and a low-pass filter, and further, the decomposed high-frequency component and the decomposed low-frequency component are respectively decomposed into a high-frequency component and a low-frequency component by using a set of a high-pass filter and a low-pass filter, respectively.

In this way, by combining the decomposition of the low frequency component with the decomposition of the high frequency component, the frequency resolution and the time resolution of the time-frequency plot over a plurality of frequency scales can be adjusted. For example, as shown in (c) of FIG. 18, the time-frequency plots with equal frequency resolution and equal time resolution can also be obtained from the low frequency region to the high frequency region. This makes it possible to detect the interference with the same accuracy even if the interference occurs at the time frequency plot of any frequency band.

It is not always necessary to equalize the frequency resolutions in the entire range from the low frequency region to the high frequency region. For example, the level of decomposition of high frequency components may be lower than the level of decomposition of low frequency components. Also, for example, the own vehicle may communicate with other vehicles traveling in the vicinity thereof to acquire information relating to frequency modulation of radar waves from radar devices mounted on the other vehicles and to adjust the frequency resolution of the time-frequency plot according to the frequency modulation characteristics.

Further, the method of combining the decomposition of the low frequency component with the decomposition of the high frequency component in the third embodiment described above may be also used for the multiple resolution analysis in which the discrete wavelet transform is performed using the lifting scheme described in the second embodiment.

Fourth Embodiment

Next, a fourth embodiment of the present disclosure will be described. In the first embodiment described above, the various methods for detecting the interference plot using the interference plot detection unit S102 have been described. Alternatively, another interference plot detection method may also be adopted.

For example, in the configuration shown in FIG. 1, a signal mixture unit 104' that mixes with a transmission signal whose phase is changed by 90 deg, a low-pass filter 105' that processes the output thereof, and an analog-digital converter 201' that processes the output thereof are arranged, so that the beat signal Bw2 can be detected as a complex number. As a result, the time sample includes not only the magnitude of the amplitude of the beat signal but also the information indicating the phase of the beat signal. Therefore, the time-frequency plot after the multiple resolution analysis by the multiple resolution analysis unit S101 also includes the amplitude (i.e., the signal intensity) and phase information. Then, for example, the interference plot detection unit S102 may detect the plot with the beat signal having the phase change equal to or larger than the predetermined threshold as the interference plot with respect to the time-frequency plot of the frequency frame as the processing target for detecting the interference plot.

Further, as another method, for example, the interference plot detection unit S102 may detect a plot corresponding to an edge as an interference plot by performing an edge extraction process. For this edge extraction process, for example, a conventional Sobel method, Canny method, Gaussian Laplacian method, or the like can be used.

In this edge extraction process, a two-dimensional edge extraction process may be performed for a time-frequency plots of a plurality of frequency frames as a target.

There have been described the preferred embodiments of the present disclosure. However, the present disclosure is not limited to the above-mentioned embodiments, and may be variously modified within the spirit and scope of the present disclosure.

For example, in each of the above-described embodiments, an example of adopting the FCM type radar device 100 has been described. Alternatively, the present disclosure may be adopted to a FMCW device or the like, in which the frequency of the transmission signal changes with time elapsed, and the beat signal is generated according to the frequency difference between the transmission signal and the reflection signal.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S200. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A radar device comprising:
  a transmission unit that transmits a transmission signal as an electromagnetic wave;
  a reception unit that receives a reflection signal formed by the transmission signal being reflected by an object;
  an interference signal processing unit that cancels an influence of an interference signal from a beat signal when the beat signal obtained by mixing the transmission signal and the reflection signal is affected by the interference signal due to a disturbance electromagnetic wave; and an object detection unit that detects the object based on the beat signal processed by the interference signal processing unit, wherein:

the interference signal processing unit includes:
- a digital converter that samples the beat signal and digitally converts the beat signal into a time sample;
- a multiple resolution analysis unit that performs multiple resolution analysis on the time sample, and converts the time sample into a plurality of time-frequency plots over a plurality of frequency scales;
- an interference plot detection unit that detects an interference plot affected by the interference signal among the time-frequency plots of the plurality of frequency scales;
- an interference cancellation unit that performs a cancellation process to cancel the influence of the interference signal with respect to the interference plot detected by the interference plot detection unit; and
- a reverse converter that performs reverse conversion of the multiple resolution analysis on the time-frequency plots of the plurality of frequency scales to which the cancellation process with respect to the interference plot is performed, and reverse converts the time-frequency plots into the time sample;

the object detection unit detects the object using the time sample that has been reversely converted by the reverse converter as the beat signal processed by the interference signal processing unit;

the multiple resolution analysis unit converts the time sample into the plurality of time-frequency plots by repeating a process for decomposing the time sample into a low frequency component and a high frequency component, and further decomposing a decomposed low frequency component into a low frequency component and a high frequency component; and when repeating the process, the multiple resolution analysis unit further decomposes a decomposed high frequency component from the time sample into a low frequency component and a high frequency component, in addition to the decomposed low frequency component from the time sample.

2. The radar device according to claim 1, wherein:
the transmission signal is a signal whose frequency changes with time elapsed; and
the beat signal obtained by mixing the transmission signal and the reflection signal is a signal indicating a frequency difference between the transmission signal and a reception signal obtained by receiving the reflection signal.

3. The radar device according to claim 1, wherein:
the multiple resolution analysis unit converts the time sample into the plurality of time-frequency plots using lifting scheme according to a Haar wavelet as a basis.

4. The radar device according to claim 1, wherein:
the multiple resolution analysis unit converts the time sample into the plurality of time-frequency plots using lifting scheme according to a biorthogonal wavelet as a basis.

5. The radar device according to claim 1, wherein:
the interference signal processing unit sets the time sample having a time length necessary for detecting the object in the object detection unit to be a target of one cancellation process of the interference signal.

6. The radar device according to claim 1, wherein:
the interference signal processing unit sets the time sample having a time length shorter than a time length of the time sample necessary for detecting the object in the object detection unit to be a target of one cancellation process of the interference signal; and the object detection unit detects the object based on the time sample obtained by performing the cancellation process of the interference signal multiple times by the interference signal processing unit.

7. The radar device according to claim 1, wherein:
the interference plot detection unit performs a process for detecting the interference plot of each time-frequency plot of each frequency scale among the time-frequency plots of the plurality of frequency scales.

8. The radar device according to claim 7, wherein:
the interference plot detection unit detects, as the interference plot, a plot having a signal intensity equal to or larger than a predetermined threshold among the time-frequency plots as a target of the process for detecting the interference plot.

9. The radar device according to claim 8, wherein:
the interference plot detection unit detects an adjacent plot adjacent to a detected plot as the interference plot on at least one of a time axis and a frequency axis as an equivalent interference plot equivalent to the interference plot among the time-frequency plots of the plurality of frequency scales when the interference plot detection unit detects the interference plot.

10. The radar device according to claim 9, wherein:
the interference plot detection unit detects only the adjacent plot adjacent to the detected plot as the interference plot on a low frequency side of the frequency axis as the equivalent interference plot equivalent to the interference plot.

11. The radar device according to claim 7, wherein:
the interference plot detection unit detects, as the interference plot, a plot having a signal intensity corresponding to an out-of-range by performing a statistical out-of-range test of each plot among the time-frequency plots as a target of the process for detecting the interference plot.

12. The radar device according to claim 7, wherein:
the interference plot detection unit detects, as the interference plot, a plot having a gradient of a signal intensity equal to or larger than a predetermined threshold by obtaining the gradient of the signal intensity of each plot using a signal intensity of an adjacent plot on a time axis among the time-frequency plots as a target of the process for detecting the interference plot.

13. The radar device according to claim 7, wherein:
the interference plot detection unit detects, as the interference plot, a plot having a gradient of a signal intensity corresponding to an out-of-range by obtaining the gradient of the signal intensity of each plot using a signal intensity of an adjacent plot on a time axis and performing a statistical out-of-range test of the gradient of the signal intensity of each plot among the time-frequency plots as a target of the process for detecting the interference plot.

14. The radar device according to claim 13, wherein:
the interference plot detection unit detects, as the interference plot, a plot having a sum of a signal intensity corresponding to an out-of-range by obtaining the sum of the signal intensity of each plot using a signal intensity of an adjacent plot on a time axis and performing a statistical out-of-range test of the sum of the signal intensity of each plot among the time-frequency plots as a target of the process for detecting the interference plot.

15. The radar device according to claim 7, wherein:
the interference plot detection unit detects, as the interference plot, a plot corresponding to an edge by performing an edge extraction process for extracting the plot corresponding to the edge having a larger change of at least one of a signal intensity of each plot and a phase of the beat signal of each plot among the time-frequency plots as a target of the process for detecting the interference plot.

16. The radar device according to claim 1, wherein:
the interference plot detection unit performs a process for detecting the interference plot of the time-frequency plots of at least two or more frequency scales among the time-frequency plots of the plurality of frequency scales.

17. The radar device according to claim 1, wherein:
the interference cancellation unit substitutes data corresponding to zero into the plot detected as the interference plot among the time-frequency plots of the plurality of frequency scales, in the cancellation process.

18. The radar device according to claim 1, wherein:
the interference cancellation unit substitutes an estimation value estimated from a waveform of a plot other than the interference plot into the plot detected as the interference plot among the time-frequency plots of the plurality of frequency scales, in the cancellation process.

19. The radar device according to claim 1, wherein:
the interference cancellation unit replaces a data of the plot detected as the interference plot with a data obtained by multiplying an original data and an attenuation coefficient that attenuates a magnitude of the interference plot among the time-frequency plots of the plurality of frequency scales, in the cancellation process.

* * * * *